United States Patent
Segawa

(10) Patent No.: US 12,551,096 B2
(45) Date of Patent: Feb. 17, 2026

(54) MEDICAL OBSERVATION SYSTEM

(71) Applicant: Sony Olympus Medical Solutions Inc., Tokyo (JP)

(72) Inventor: Kazunori Segawa, Tokyo (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 257 days.

(21) Appl. No.: 18/548,221

(22) PCT Filed: Oct. 20, 2021

(86) PCT No.: PCT/JP2021/038833
§ 371 (c)(1),
(2) Date: Aug. 29, 2023

(87) PCT Pub. No.: WO2022/195940
PCT Pub. Date: Sep. 22, 2022

(65) Prior Publication Data
US 2024/0130609 A1   Apr. 25, 2024
US 2024/0225432 A9   Jul. 11, 2024

(30) Foreign Application Priority Data

Mar. 19, 2021 (JP) ................. 2021-046647

(51) Int. Cl.
*A61B 1/06* (2006.01)
*A61B 1/00* (2006.01)
*A61B 1/04* (2006.01)

(52) U.S. Cl.
CPC ........ *A61B 1/0638* (2013.01); *A61B 1/00186* (2013.01); *A61B 1/042* (2013.01); *A61B 1/0655* (2022.02)

(58) Field of Classification Search
None
See application file for complete search history.

(56) References Cited

U.S. PATENT DOCUMENTS

2002/0138008 A1 * 9/2002 Tsujita ............... A61B 1/05
                                                                600/476
2015/0381909 A1 * 12/2015 Butte .............. A61B 1/00188
                                                                250/578.1
(Continued)

FOREIGN PATENT DOCUMENTS

JP   2013-026987 A   2/2013
JP   2013-531538 A   8/2013
(Continued)

OTHER PUBLICATIONS

International Search Report and Written Opinion mailed on Jan. 11, 2022, received for PCT Application PCT/JP2021/038833, filed on Oct. 20, 2021, 12 pages including English Translation.

*Primary Examiner* — Michael W Kahelin
(74) *Attorney, Agent, or Firm* — XSENSUS LLP

(57) ABSTRACT

A medical observation system includes a white light source that emits white light, an infrared light source that emits infrared light, a light source controller that performs control to alternately repeat a first mode and a second mode in chronological order, in the first mode the white light source is caused to emit the white light, and in the second mode the infrared light source is caused to emit the infrared light and the white light source is caused to emit light with a wavelength from green to blue wavelength bands, and an imaging unit that captures a subject. Therefore, a medical observation system is provided that is configured to simultaneously perform normal observation and infrared observation without hindering the operation of an operator.

11 Claims, 6 Drawing Sheets

(56) References Cited

U.S. PATENT DOCUMENTS

| | | | |
|---|---|---|---|
| 2018/0116756 A9* | 5/2018 | McDowall | A61B 5/0071 |
| 2018/0199801 A1* | 7/2018 | Tsuruta | A61B 1/0638 |
| 2018/0228352 A1* | 8/2018 | Kojima | A61B 1/0638 |
| 2020/0383558 A1* | 12/2020 | Goebel | G01N 21/6456 |

FOREIGN PATENT DOCUMENTS

| | | |
|---|---|---|
| JP | 2016-518197 A | 6/2016 |
| WO | 2017/042980 A1 | 3/2017 |
| WO | WO-2017047140 A1 | 3/2017 |
| WO | WO-2017073302 A1 | 5/2017 |
| WO | 2019/176253 A1 | 9/2019 |

* cited by examiner

MEDICAL OBSERVATION SYSTEM

CROSS-REFERENCE TO RELATED APPLICATIONS

The present application is based on PCT filing PCT/JP2021/038833, filed Oct. 20, 2021, which claims priority to Japanese Patent Application No. 2021-046647, filed Mar. 19, 2021, the contents of each are incorporated herein by reference.

FIELD

The present disclosure relates to a medical observation system.

BACKGROUND

There are known conventional endoscopes each operable to switch between normal observation performed by emitting white light to a subject and infrared observation performed by emitting infrared light to the subject or operable to simultaneously perform the normal observation and the infrared observation. Patent Literature 1 describes an endoscope operable to emit white light and infrared light to a subject alternately in chronological order, simultaneously performing normal observation and infrared observation.

CITATION LIST

Patent Literature

Patent Literature 1: JP 2013-26987 A

SUMMARY

Technical Problem

However, unlike such an endoscope used for abdominal observation, in an exoscope or microscope used for abdominal surgery and craniotomy surgery, when irradiating a subject with white light and infrared light alternately switched and emitted in chronological order, an operator perceives the switching of light, and therefore, in some cases, the operation of the operator may be hindered.

The present disclosure has been made in view of the above, and an object of the present disclosure is to provide a medical observation system that is configured to simultaneously perform normal observation and infrared observation without hindering the operation of an operator.

Solution to Problem

To solve the above-described problem and achieve the object, a medical observation system according to one aspect of the present disclosure includes: a white light source configured to emit white light; an infrared light source configured to emit infrared light; a light source controller configured to perform control to alternately repeat a first mode and a second mode in chronological order, in the first mode the white light source being caused to emit the white light, in the second mode the infrared light source being caused to emit the infrared light and the white light source being caused to emit light with a wavelength from green to blue wavelength bands; and an imaging unit configured to capture a subject.

Moreover, the medical observation system according to one aspect of the present disclosure further includes an image superimposition processing unit configured to superimpose an infrared image captured in the second mode, on a white-light Image captured in the first mode.

Moreover, in the medical observation system according to one aspect of the present disclosure, the light source controller is configured to increase an amount of light emitted by the white light source in the second mode relative to an amount of the white light emitted by the white light source in the first mode.

Moreover, in the medical observation system according to one aspect of the present disclosure, the imaging unit is an exoscope configured to capture the subject from outside a body.

Moreover, the medical observation system according to one aspect of the present disclosure, the imaging unit includes: a color filter including a filter transmitting red light, a filter transmitting green light, and a filter transmitting blue light; and a sensor configured to receive light transmitted through the color filter.

Moreover, in the medical observation system according to one aspect of the present disclosure, the imaging unit includes a spectroscope configured to reflect light from the subject in different directions according to wavelengths, and a plurality of sensors having sensitivity corresponding to the wavelengths obtained by splitting by the spectroscope.

Moreover, in the medical observation system according to one aspect of the present disclosure, the imaging unit includes: a light splitting unit configured to split light from the subject into a plurality of paths; and a plurality of sensors arranged on the plurality of paths obtained by splitting by the light splitting unit.

Moreover, in the medical observation system according to one aspect of the present disclosure, the white light source includes an R light source configured to emit red light, a G light source configured to emit green light, and a B light source configured to emit blue light, and the light source controller is configured to cause the R light source, the G light source, and the B light source to emit the white light obtained by combining RGB light, in the first mode, and cause the infrared light source to emit the infrared light and cause the G light source to emit the green light or causes the G light source and the B light source to emit the green light and the blue light, respectively, in the second mode.

Moreover, in the medical observation system according to one aspect of the present disclosure, the light source controller is configured to insert a filter configured to remove red light, into an optical path of light emitted from the white light source in the second mode, and remove the filter from the optical path of the light emitted from the white light source in the first mode.

Moreover, the medical observation system according to one aspect of the present disclosure, the filter has a plate shape, and the light source controller is configured to insert and remove the filter into and from the optical path of the light emitted from the white light source by translating the filter.

Moreover, the medical observation system according to one aspect of the present disclosure, the filter is a disk-shaped filter in which a filter portion and a gap portion are alternately arranged circumferentially, and the light source controller is configured to insert and remove the filter into and from the optical path of the light emitted from the white light source by rotating the filter.

Moreover, the medical observation system according to one aspect of the present disclosure further includes a control unit configured to control a shutter speed of the imaging unit.

Advantageous Effects of Invention

According to the present disclosure, it is possible to achieve the medical observation system configured to simultaneously perform the normal observation and the infrared observation without hindering the operation of the operator.

DESCRIPTION OF EMBODIMENTS

Figure 1:
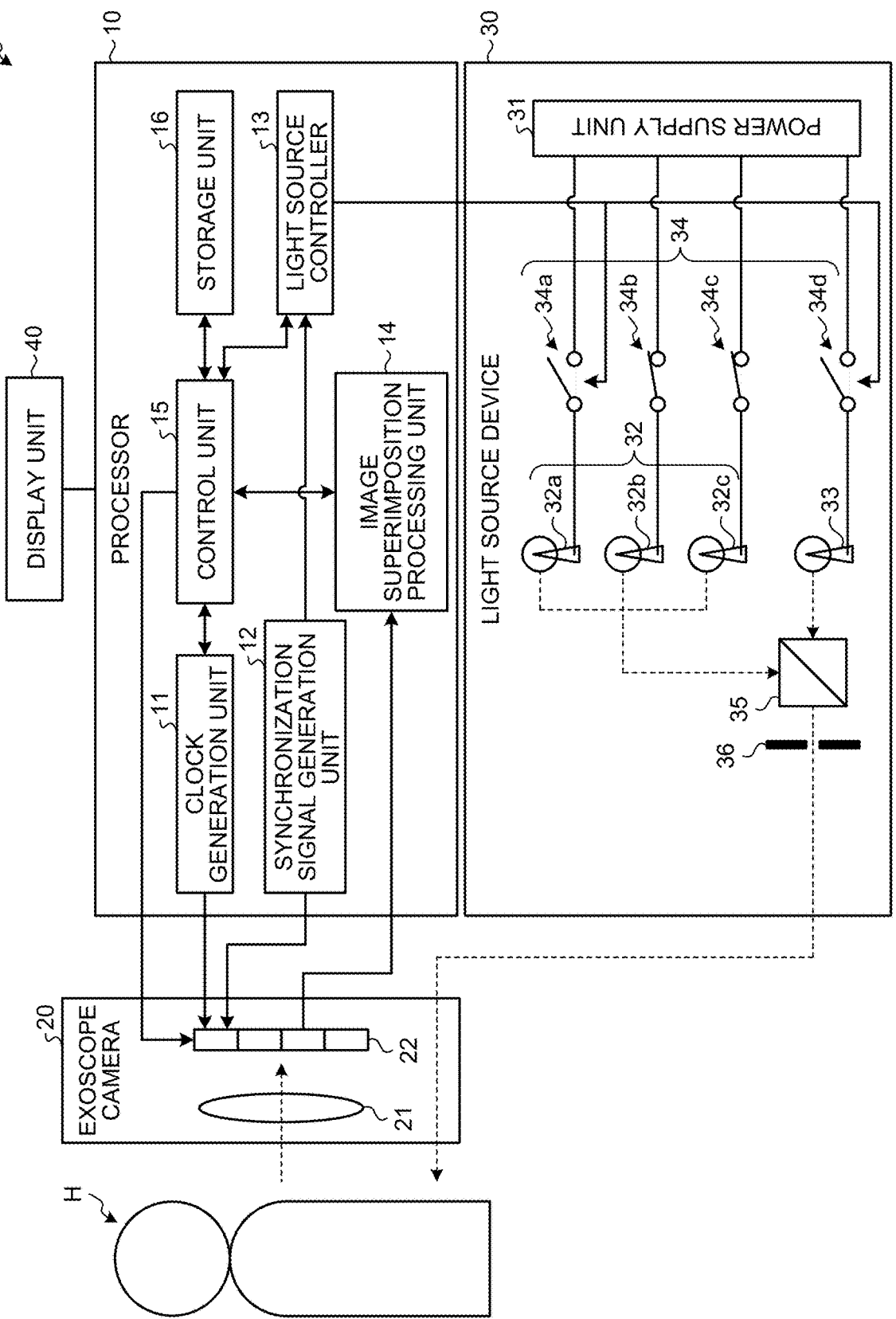
FIG. 1 is a schematic diagram illustrating a configuration of an exoscope observation system according to an embodiment.

Modes for carrying out the present disclosure (hereinafter referred to as embodiments) will be described below with reference to the drawings. Note that the present disclosure is not limited to the embodiments described below. Furthermore, in the description of the drawings, the same portions are denoted by the same reference numerals.

EMBODIMENT

FIG. 1 is a schematic diagram illustrating a configuration of an exoscope observation system according to an embodiment. An exoscope observation system 1 is a medical observation system that is used for assisting observation of a subject H by an operator who performs surgery, upon open surgery such as abdominal surgery, thoracotomy surgery, or craniotomy surgery, for the subject H, and that is configured to perform normal observation and infrared observation at the same time. Note that the medical observation system is, for example, an exoscope observation system including an exoscope, but may be an observation system (surgical microscope system) including a microscope such as a surgical microscope or an optical microscope. The exoscope observation system 1 includes a processor 10, an exoscope camera 20, a light source device 30, and a display unit 40.

The processor 10 includes a clock generation unit 11, a synchronization signal generation unit 12, a light source controller 13, an image superimposition processing unit 14, a control unit 15, and a storage unit 16.

The clock generation unit 11 generates a clock signal that is a driving timing signal for driving the exoscope observation system 1, and outputs the clock signal to an imaging unit 22.

The synchronization signal generation unit 12 generates a synchronization signal that is a driving timing signal for driving the exoscope observation system 1, and outputs the synchronization signal to the imaging unit 22 and the light source controller 13. The synchronization signal is a signal that controls the timing of switching between a first mode and a second mode. In the first mode, a white light source is caused to emit white light, and in the second mode, an infrared light source is caused to emit infrared light and the white light source is caused to emit light with a wavelength from the green wavelength band to the blue wavelength band.

The light source controller 13 controls the light source device 30 at timing according to the synchronization signal under the control of the control unit 15. The light source controller 13 performs control to alternately repeat the first mode and the second mode in chronological order. In the first mode, the white light source is caused to emit the white light, and in the second mode, the infrared light source is caused to emit the infrared light and the white light source is caused to emit light with a wavelength from the green to blue wavelength bands.

Figure 2:
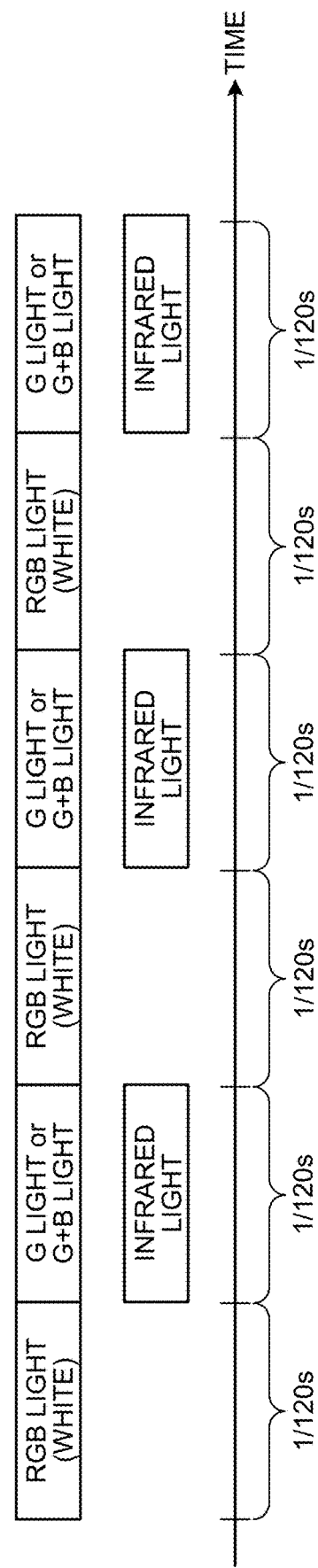
FIG. 2 is a diagram illustrating temporal change of light emitted to a subject by the exoscope observation system illustrated in FIG. 1.

FIG. 2 is a diagram illustrating temporal change of light emitted to the subject by the exoscope observation system illustrated in FIG. 1. As illustrated in FIG. 2, the light source controller 13 controls, for example, to alternately emit the white light that is combined RGB light, and the infrared light and G light or G light and B light, to a surgical field in a $\frac{1}{120}$ s cycle. In other words, the light source controller 13 causes an R light source, a G light source, and a B light source of the white light source to emit the white light obtained by combining RGB light, in the first mode, and causes the infrared light source to emit the infrared light and causes the G light source to emit G light or causes the G light source and the B light source to emit G light and B light, respectively, in the second mode. At this time, the white light source alternately switches the wavelength bands of the light to be emitted in the first mode and the second mode, but continuously emits light. Note that the emission cycle is not limited to $\frac{1}{120}$ s, and the cycle is preferably any cycle as long as the white light, and the infrared light and G light or G light and B light can be alternately emitted in chronological order.

Figure 3:
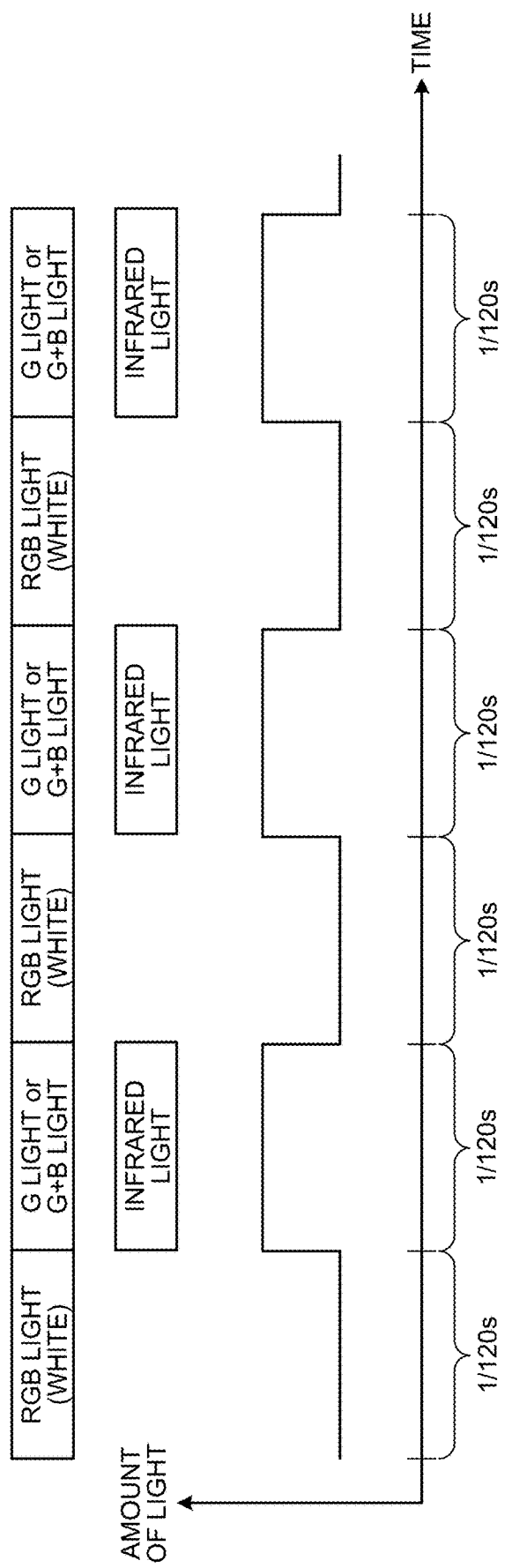
FIG. 3 is a diagram illustrating a temporal change in amount of G light or amounts of G light and B light.

FIG. 3 is a diagram illustrating a temporal change in amount of G light or amounts of G light and B light. As illustrated in FIG. 3, the light source controller 13 may increase the amount of light emitted by the white light source in the second mode relative to the amount of the white light emitted by the white light source in the first mode. In the second mode, non-emission of R light by the white light source reduces an overall amount of light than that in the first mode. Therefore, in the second mode, the amount of B light or the amount of B light and G light may be increased relative to that in the first mode to reduce a difference in the overall amount of light between the first mode and the second mode, making it difficult for the operator to perceive the switching of light.

The image superimposition processing unit 14 superimposes an infrared image captured in the second mode on a white-light Image captured in the first mode. The image superimposition processing unit 14 superimposes the infrared image that is a monochrome image colored, for example, green, on the white-light Image. For example, when indocyanine green (ICG) fluorescence observation is performed by using the exoscope observation system 1, an image of fluorescence emitted by excitation with infrared light is captured, and the captured image is superimposed on the white-light Image. This configuration facilitates visual recognition of the blood vessel and the like by the operator.

The control unit 15 integrally controls operations of the whole exoscope observation system 1. Furthermore, the control unit 15 controls the shutter speed of the imaging unit 22.

The clock generation unit 11, the synchronization signal generation unit 12, the light source controller 13, the image superimposition processing unit 14, and the control unit 15 are implemented using a general-purpose processor such as a central processing unit (CPU) having an internal memory in which programs are recorded or dedicated processors such as various arithmetic circuits, such as an application specific integrated circuit (ASIC), that execute specific functions. In addition, a field programmable gate array (FPGA), which is a type of programmable integrated circuit, may be used. Note that when the FPGA is used, a memory for storing configuration data may be provided to configure FPGA as the programmable integrated circuit by using the configuration data read from the memory.

The storage unit 16 includes a semiconductor memory such as a flash memory or a dynamic random access memory (DRAM), and temporarily stores various programs executed by the exoscope observation system 1 and in-process data.

The exoscope camera 20 includes a lens 21 and the imaging unit 22.

The lens 21 collects light from the subject H. For example, in the open surgery such as abdominal surgery, thoracotomy surgery, or craniotomy surgery, the subject H is the surgical field.

The imaging unit 22 images the subject H from outside the body to generate an image. The imaging unit 22 includes a color filter that has a filter transmitting red light, a filter transmitting green light, and a filter transmitting blue light, and a sensor that receives light transmitted through the color filter. The color filter may be a color filter in which the filters corresponding to the respective colors are arranged in a two-dimensional matrix with a predetermined pattern. The predetermined pattern may be but is not limited to, for example, a Bayer array. The sensor (imaging element) includes a charge coupled device (CCD) or a complementary metal oxide semiconductor (CMOS). Furthermore, preferably, the sensor is an imaging element having the number of pixels corresponding to, for example, a 4K resolution (3840 horizontal pixels×2160 vertical pixels), 8K resolution (7680 horizontal pixels×4320 vertical pixels), or square 4K resolution (3840 or more horizontal pixels×3840 or more vertical pixels). Furthermore, the imaging unit 22 may be provided with an excitation light cut filter between the lens and the color filter of the sensor. For example, a filter that cuts excitation light being infrared light and transmits fluorescence being infrared light having a wavelength different from that of the excitation light is provided on the upstream of the sensor that receives red light. The sensor may be one sensor chip or a plurality of sensor chips. For example, a prism that separates incident light into each predetermined wavelength band may be provided so that different light receiving elements capture the respective wavelength bands. For example, when a two-board configuration having two sensor chips is provided, one can be used for receiving RGB light (visible light), and the other can be used for receiving infrared light. Furthermore, when a three-board configuration having three sensor chips are provided, one can be used for receiving R light, another can be used for receiving G light and B light, and the other may be used for receiving infrared light. Note that, when a plurality of sensor chips is used, a short-pass filter, a long-pass filter, or a band-pass filter according to the wavelength of light received by each sensor can be used to cause the sensor to receive light in a desired wavelength band. In addition, a plurality of light receiving elements may be provided for stereoscopic vision.

The light source device 30 includes a power supply unit 31, a white light source 32, an infrared light source 33, a switch unit 34, a multiplexer 35, and a light source diaphragm 36.

The power supply unit 31 supplies power to the white light source 32 and the infrared light source 33 under the control of the light source controller 13.

The white light source 32 emits the white light to the subject. The white light source 32 includes an R light source 32*a* that emits red light, a G light source 32*b* that emits green light, and a B light source 32*c* that emits blue light. The R light source 32*a*, the G light source 32*b*, and the B light source 32*c* each include a solid-state light emitting device such as a light emitting diode (LED) or a laser diode (LD), a light emission member such as a lase R light source, or the like.

The infrared light source 33 emits the infrared light to the subject. The infrared light source 33 includes a solid-state light emitting device such as an LED or LD, a light emission member such as a laser light source, or the like.

The switch unit 34 includes switches 34*a* to 34*d* connected to the R light source 32*a*, the G light source 32*b*, the B light source 32*c*, and the infrared light source 33, respectively, and the switch unit 34 switches whether to supply power to the R light source 32*a*, the G light source 32*b*, the B light source 32*c*, and the infrared light source 33 under the control of the light source controller 13.

The multiplexer 35 multiplexes light emitted by the R light source 32*a*, the G light source 32*b*, the B light source 32*c*, and the infrared light source 33.

The light source diaphragm 36 adjusts the amount of light to be output to the exoscope camera 20.

The display unit 40 displays an image or the like captured by the exoscope camera 20. The display unit 40 includes a cathode ray tube (CRT) display or a liquid crystal or organic electro luminescence (EL) display panel. Note that, in addition to the display unit 40, an output device that outputs information by using a speaker, a printer, or the like may be provided.

According to the embodiment described above, B light or B light and G light are emitted also upon the infrared observation (second mode) by using the light source device 30, thereby reducing a change in the color of light emitted to the subject H during the normal observation (first mode) and the infrared observation (second mode) is reduced. Therefore, the normal observation and the infrared observation can be performed simultaneously without hindering the operation of the operator. In particular, in the present embodiment, as described with reference to FIG. 2, the white light source continues to emit light to the subject H during the normal observation (first mode) and the infrared observation (second mode), and the change in color of light is reduced. Therefore, the normal observation and the infrared observation can be performed simultaneously without hindering the operation of the operator.

Furthermore, in the infrared observation, the amount of B light or the amount of B light and G light may be increased relative to that in the normal observation to reduce a difference in the overall amount of light between the normal observation (first mode) and the infrared observation (second mode), making it difficult for the operator to perceive the switching of light. When this modulation of light causes excessive exposure, the control unit 15 may control the shutter speed of the imaging unit 22 to adjust the exposure.

In addition, in a medical observation system including an optical microscope instead of the exoscope, an imaging unit is arranged in an eyepiece unit, and an image captured by the imaging unit is displayed on the display unit so that a medical expert such as a doctor may observe the image. In this configuration, in the image captured by the imaging unit, a change in color of light emitted to the subject H between the normal observation (first mode) and the infrared observation (second mode) is reduced. Therefore, the normal observation and the infrared observation can be performed simultaneously, without hindering the operation of the operator.

(Modification)

Figure 4:
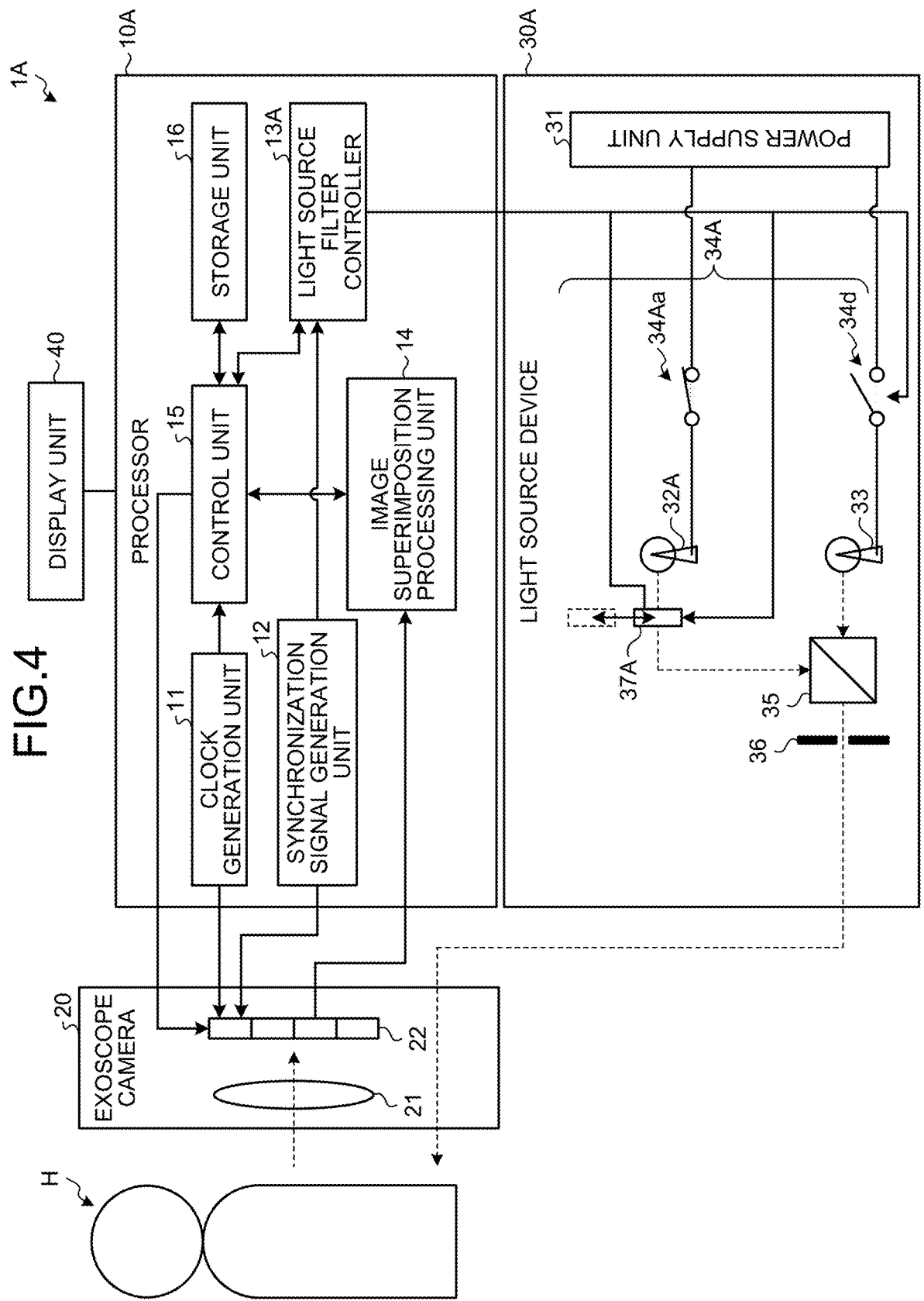
FIG. 4 is a schematic diagram illustrating a configuration of an exoscope observation system according to a modification.

Next, an exoscope observation system 1A according to a modification will be described. FIG. 4 is a schematic diagram illustrating a configuration of the exoscope observation system according to the modification. In the exoscope observation system 1A, a processor 10A includes a light source filter controller 13A, and a light source device 30A includes a white light source 32A, a switch unit 34A, and a filter 37A. The other configurations may be the same as those of the embodiment and denoted by the same reference numerals as those of the embodiment, and the description thereof will be omitted.

The light source filter controller 13A controls the light source device 30A at timing according to the synchronization signal, under the control of the control unit 15. The light source filter controller 13A performs control to alternately repeat the first mode and the second mode in chronological order. In the first mode, the white light source is caused to emit white light, and in the second mode, the infrared light source is caused to emit infrared light and the white light source is caused to emit light with a wavelength from the green wavelength band to the blue wavelength band. Furthermore, the light source filter controller 13A controls the filter 37A. The light source filter controller 13A inserts the filter 37A into an optical path of light emitted from the white light source 32A in the infrared observation (second mode), and removes the filter 37A from the optical path of the light emitted from the white light source 32A in the normal observation (first mode).

Figure 5:
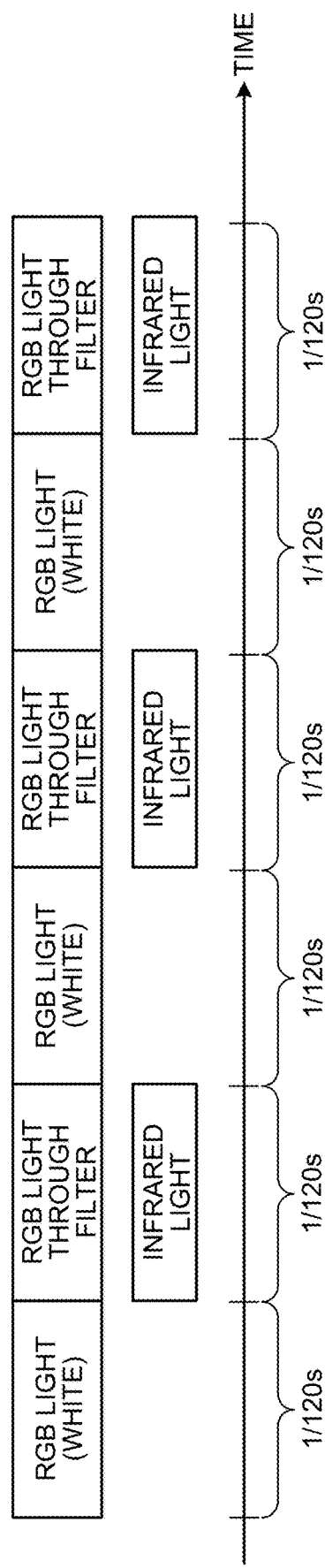
FIG. 5 is a diagram illustrating temporal change of light emitted to the subject by the exoscope observation system illustrated in FIG. 4.

FIG. 5 is a diagram illustrating temporal change of light emitted to the subject by the exoscope observation system illustrated in FIG. 4. As illustrated in FIG. 5, the light source filter controller 13A alternately emits the white light that is obtained by superposing RGB light, and light that is obtained by superposing the infrared light and light from green to blue wavelengths passing through the filter, for example, in a 1/120 s cycle. At this time, the white light source alternately switches the wavelength bands of the light to be emitted in the first mode and the second mode, but continuously emits light. In other words, the light from green to blue wavelengths that has passed through the filter is light generated by the passage of the white light through the filter.

The white light source 32A emits the white light to the subject. For the white light source 32A, a white light source, such as a halogen lamp, having a continuous spectrum in a wavelength band of visible light may be used.

The switch unit 34A includes switches 34Aa and 34d connected to the white light source 32A and the infrared light source 33, respectively, and the switch unit 34A switches whether to supply power to the white light source 32A and the infrared light source 33 under the control of the light source filter controller 13A.

Figure 6:
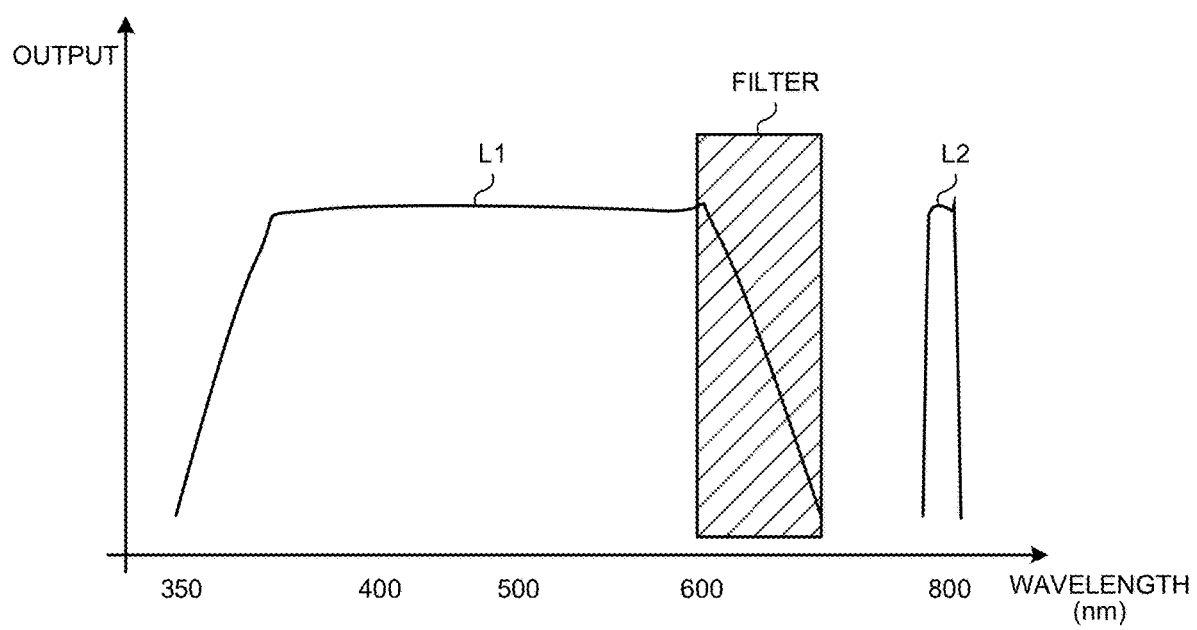
FIG. 6 is a diagram illustrating an exemplary wavelength band to be removed by a filter.

The filter 37A is inserted into and removed from the optical path of the light emitted from the white light source 32A, and removes part of the light emitted from the white light source 32A in the infrared observation (second mode). FIG. 6 is a diagram illustrating an exemplary wavelength band to be removed by the filter. A line L1 illustrated in FIG. 6 represents the white light emitted from the white light source 32A, and a line L2 represents the infrared light emitted from the infrared light source 33. The filter 37A removes an R light component (e.g., wavelengths 600 nm to 700 nm) of the white light. Note that the filter 37A may be arranged anywhere on the upstream of the imaging unit 22, as long as the filter 37A is positioned on the optical path of the white light emitted from the white light source 32A.

Note that, when the filter 37A has a plate shape, the light source filter controller 13A may insert and remove the filter 37A into and from the optical path of the light emitted from the white light source 32A by translating the filter 37A. Furthermore, when the filter 37A is a disk-shaped filter in which a filter portion and a gap portion are alternately arranged circumferentially, the light source filter controller 13A may insert and remove the filter 37A into and from the optical path of the light emitted from the white light source 32A by rotating the filter 37A.

According to the modification described above, light having B light and G light components is emitted also upon the infrared observation (second mode) by using the light source device 30A, thereby reducing a change in the color of light emitted to the subject H during the normal observation (first mode) and the infrared observation (second mode) is reduced. Therefore, the normal observation and the infrared observation can be performed simultaneously without hindering the operation of the operator.

In addition, similarly to FIG. 3, the light source filter controller 13A may increase the amount of light emitted by the white light source in the infrared observation relative to the amount of light emitted by the white light source in the normal observation. In the infrared observation, part of the white light source is removed by the filter 37A, and the overall amount of light becomes smaller than that in the normal observation. Therefore, in the infrared observation, the amount of light having the B light and G light components may be increased relative to that in the normal observation to reduce a difference in the overall amount of light between the normal observation (first mode) and the infrared observation (second mode), making it difficult for the operator to perceive the switching of light.

Note that the imaging unit 22 may have a configuration including a light splitting unit that splits light from the subject H into a plurality of paths, and a plurality of sensors that is arranged on the plurality of paths obtained by splitting by the light splitting unit. Specifically, the imaging unit 22 may have a configuration including a spectroscope that reflects light from the subject H in different directions according to wavelengths, and a plurality of sensors that has sensitivity corresponding to the wavelengths obtained by splitting by the spectroscope. In addition, a color filter may be arranged between the light splitting unit and the sensor.

The preferred embodiments of the present disclosure have been described above with reference to the accompanying drawings, while the present disclosure is not limited to the above examples. A person skilled in the art may find various alterations and modifications within the scope of the appended claims, and it should be understood that they will naturally come under the technical scope of the present disclosure.

For example, the processor 10 having been described in the present specification may be configured as a system by implementing some or all of the components as separate devices. For example, the processor 10 may include a light source, and the control unit may be a system implemented by an external device.

The series of processes carried out by each device described in the present specification may be implemented by software, hardware, or a combination of thereof. Programs that compose such software may be stored in advance for example on a storage medium (non-transitory medium) provided inside or outside each device. As one example, during execution by a computer, such programs are written into a RAM and executed by a processor such as a CPU.

Furthermore, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present disclosure may also be configured as below.

(1)
A medical observation system including:
  a white light source configured to emit white light;
  an infrared light source configured to emit infrared light;
  a light source controller configured to perform control to alternately repeat a first mode and a second mode in chronological order, in the first mode the white light source being caused to emit the white light, in the second mode the infrared light source being caused to emit the infrared light and the white light source being caused to emit light with a wavelength from green to blue wavelength bands; and
  an imaging unit configured to capture a subject.

(2)
The medical observation system according to (1), further including an image superimposition processing unit configured to superimpose an infrared image captured in the second mode, on a white-light Image captured in the first mode.

(3)
The medical observation system according to (1) or (2), wherein the light source controller is configured to increase an amount of light emitted by the white light source in the second mode relative to an amount of the white light emitted by the white light source in the first mode.

(4)
The medical observation system according to any one of (1) to (3), wherein the imaging unit is an exoscope configured to capture the subject from outside a body.

(5)
The medical observation system according to any one of (1) to (4), wherein the imaging unit includes:
  a color filter including a filter transmitting red light, a filter transmitting green light, and a filter transmitting blue light; and
  a sensor configured to receive light transmitted through the color filter.

(6)
The medical observation system according to (5), wherein the imaging unit includes a spectroscope configured to reflect light from the subject in different directions according to wavelengths, and a plurality of sensors having sensitivity corresponding to the wavelengths obtained by splitting by the spectroscope.

(7)
The medical observation system according to any one of (1) to (6), wherein the imaging unit includes:
  a light splitting unit configured to split light from the subject into a plurality of paths; and
  a plurality of sensors arranged on the plurality of paths obtained by splitting by the light splitting unit.

(8)
The medical observation system according to any one of (1) to (7), wherein
  the white light source includes an R light source configured to emit red light, a G light source configured to emit green light, and a B light source configured to emit blue light, and
  the light source controller is configured to
    cause the R light source, the G light source, and the B light source to emit the white light obtained by combining RGB light, in the first mode, and
    cause the infrared light source to emit the infrared light and cause the G light source to emit the green light or causes the G light source and the B light source to emit the green light and the blue light, respectively, in the second mode.

(9)
The medical observation system according to any one of (1) to (8), wherein the light source controller is configured to
  insert a filter configured to remove red light, into an optical path of light emitted from the white light source in the second mode, and
  remove the filter from the optical path of the light emitted from the white light source in the first mode.

(10)
The medical observation system according to (9), wherein
  the filter has a plate shape, and
  the light source controller is configured to insert and remove the filter into and from the optical path of the light emitted from the white light source by translating the filter.

(11)
The medical observation system according to (9) or (10), wherein
  the filter is a disk-shaped filter in which a filter portion and a gap portion are alternately arranged circumferentially, and
  the light source controller is configured to insert and remove the filter into and from the optical path of the light emitted from the white light source by rotating the filter.

(12)
The medical observation system according to any one of (1) to (11), further including a control unit configured to control a shutter speed of the imaging unit.

REFERENCE SIGNS LIST 1, 1A EXOSCOPE OBSERVATION SYSTEM
10, 10A PROCESSOR
11 CLOCK GENERATION UNIT
12 SYNCHRONIZATION SIGNAL GENERATION UNIT
13 LIGHT SOURCE CONTROLLER
13A LIGHT SOURCE FILTER CONTROLLER
14 IMAGE SUPERIMPOSITION PROCESSING UNIT
15 CONTROL UNIT
16 STORAGE UNIT
20 EXOSCOPE CAMERA
21 LENS
22 IMAGING UNIT
30, 30A LIGHT SOURCE DEVICE

31 POWER SUPPLY UNIT
32, 32A WHITE LIGHT SOURCE
32a R LIGHT SOURCE
32b G LIGHT SOURCE
32c B LIGHT SOURCE
33 INFRARED LIGHT SOURCE
34, 34A SWITCH UNIT
34a to 34d, 34Aa SWITCH
35 MULTIPLEXER
36 LIGHT SOURCE DIAPHRAGM
37A FILTER
H SUBJECT
40 DISPLAY UNIT

The invention claimed is:

1. A medical observation system comprising:
a white light source configured to emit white light;
an infrared light source configured to emit infrared light;
processing circuitry configured to perform control to alternately repeat a first mode and a second mode in chronological order, in the first mode the white light source being caused to emit the white light, in the second mode the infrared light source being caused to emit the infrared light and the white light source being caused to emit light with a wavelength from green to blue wavelength bands; and
an imaging sensor configured to capture a subject, wherein
the processing circuitry is configured to increase an amount of light emitted by the white light source in the second mode relative to an amount of the white light emitted by the white light source in the first mode.

2. The medical observation system according to claim 1, further wherein the processing circuitry is configured to superimpose an infrared image captured in the second mode, on a white-light Image captured in the first mode.

3. The medical observation system according to claim 1, wherein the imaging sensor is an exoscope configured to capture the subject from outside a body.

4. The medical observation system according to claim 1, wherein the imaging sensor includes:
a color filter including a filter transmitting red light, a filter transmitting green light, and a filter transmitting blue light; and
a sensor configured to receive light transmitted through the color filter.

5. The medical observation system according to claim 4, wherein the imaging sensor includes a spectroscope configured to reflect light from the subject in different directions according to wavelengths, and a plurality of sensors having sensitivity corresponding to the wavelengths obtained by splitting by the spectroscope.

6. The medical observation system according to claim 1, wherein the imaging sensor includes:
a light splitting unit configured to split light from the subject into a plurality of paths; and
a plurality of sensors arranged on the plurality of paths obtained by splitting by the light splitting unit.

7. The medical observation system according to claim 1, wherein
the white light source includes an R light source configured to emit red light, a G light source configured to emit green light, and a B light source configured to emit blue light, and
the processing circuitry is configured to
cause the R light source, the G light source, and the B light source to emit the white light obtained by combining RGB light, in the first mode, and
cause the infrared light source to emit the infrared light and cause the G light source to emit the green light or causes the G light source and the B light source to emit the green light and the blue light, respectively, in the second mode.

8. The medical observation system according to claim 1, wherein the processing circuitry is configured to
insert a filter configured to remove red light, into an optical path of light emitted from the white light source in the second mode, and
remove the filter from the optical path of the light emitted from the white light source in the first mode.

9. The medical observation system according to claim 8, wherein
the filter has a plate shape, and
the processing circuitry is configured to insert and remove the filter into and from the optical path of the light emitted from the white light source by translating the filter.

10. The medical observation system according to claim 8, wherein
the filter is a disk-shaped filter in which a filter portion and a gap portion are alternately arranged circumferentially, and
the processing circuitry is configured to insert and remove the filter into and from the optical path of the light emitted from the white light source by rotating the filter.

11. The medical observation system according to claim 1, wherein the processing circuitry is configured to control a shutter speed of the imaging sensor.

* * * * *